US012803863B2

(12) United States Patent
Öhlén et al.

(10) Patent No.: US 12,803,863 B2
(45) Date of Patent: Nov. 17, 2026

(54) CONTROLLER, A LOAD BALANCER AND METHODS THEREIN FOR HANDLING FAILURES OR CHANGES OF PROCESSING ELEMENTS IN A VIRTUAL NETWORK

(71) Applicant: Telefonaktiebolaget LM Ericsson (publ), Stockholm (SE)

(72) Inventors: Peter Öhlén, Stockholm (SE); Shah Nawaz Khan, Stockholm (SE); Pedro Batista, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 138 days.

(21) Appl. No.: 18/003,250

(22) PCT Filed: Jun. 26, 2020

(86) PCT No.: PCT/SE2020/050675
§ 371 (c)(1),
(2) Date: Dec. 23, 2022

(87) PCT Pub. No.: WO2021/262058
PCT Pub. Date: Dec. 30, 2021

(65) Prior Publication Data
US 2023/0261929 A1 Aug. 17, 2023

(51) Int. Cl.
*H04L 41/0604* (2022.01)
*H04L 41/0654* (2022.01)
*H04L 67/146* (2022.01)

(52) U.S. Cl.
CPC ...... *H04L 41/0627* (2013.01); *H04L 41/0654* (2013.01); *H04L 67/146* (2013.01)

(58) Field of Classification Search
CPC ............. H04L 41/0627; H04L 41/0654; H04L 67/146
See application file for complete search history.

(56) References Cited

U.S. PATENT DOCUMENTS 8,806,266 B1 * 8/2014 Qu ...................... G06F 11/1438 714/4.11
9,535,798 B1 1/2017 Liguori
(Continued)

FOREIGN PATENT DOCUMENTS

WO 2012143844 A1 10/2012

OTHER PUBLICATIONS

European Search Report dated Jul. 7, 2023 for Application No. 20942105.6, consisting of 10 pages.
(Continued)

*Primary Examiner* — Dhairya A Patel
(74) *Attorney, Agent, or Firm* — Weisberg I.P. Law, P.A.

(57) ABSTRACT

A method and a controller for handling a failure or change of a processing element in a virtual network are provided. The processing element includes a first stateless executable function that use a local state storage and a persistent state storage when executed on a host in the virtual network. The controller maintains the local state storage of the processing element upon removing the first stateless executable function from the processing element in response to the failure or change. The controller also creates a second stateless executable function to replace the first stateless executable function in the processing element. Then, the controller associates the maintained local state storage with the second stateless executable function for the processing element. Further, the controller initiates the second stateless executable function using the associated maintained local state storage such that the processing element resumes execution from its real-time state before the failure or change.

12 Claims, 7 Drawing Sheets

(56) References Cited

U.S. PATENT DOCUMENTS

| | | | | |
|---|---|---|---|---|
| 9,785,519 | B1 | 10/2017 | Tsirkin et al. | |
| 11,256,552 | B1* | 2/2022 | Lam | G06F 9/5083 |
| 2015/0309883 | A1 | 10/2015 | North | |
| 2016/0019107 | A1 | 1/2016 | North | |
| 2016/0026546 | A1 | 1/2016 | Ljubuncic et al. | |
| 2016/0077921 | A1 | 3/2016 | Yoshinari et al. | |
| 2016/0313986 | A1 | 10/2016 | Liguori et al. | |
| 2016/0371127 | A1* | 12/2016 | Antony | G06F 11/0793 |
| 2018/0367288 | A1* | 12/2018 | Vrzic | H04L 1/189 |
| 2019/0102265 | A1* | 4/2019 | Ngo | H04L 67/1034 |
| 2020/0409803 | A1* | 12/2020 | Naidu | G06F 11/1451 |
| 2021/0133003 | A1* | 5/2021 | Rao | G06F 9/45558 |
| 2026/0164389 | A1* | 6/2026 | Ou | H04W 60/04 |

OTHER PUBLICATIONS

International Search Report and Written Opinion dated May 26, 2021 for International Application No. PCT/SE2020/050675 filed Jun. 26, 2020; consisting of 11 pages.

* cited by examiner

CONTROLLER, A LOAD BALANCER AND METHODS THEREIN FOR HANDLING FAILURES OR CHANGES OF PROCESSING ELEMENTS IN A VIRTUAL NETWORK

CROSS-REFERENCE TO RELATED APPLICATION

This application is a Submission Under 35 U.S.C. § 371 for U.S. National Stage Patent Application of International Application Number: PCT/SE2020/050675, filed Jun. 26, 2020 entitled "A CONTROLLER, A LOAD BALANCER AND METHODS THEREIN FOR HANDLING FAILURES OR CHANGES OF PROCESSING ELEMENTS IN A VIRTUAL NETWORK," the entirety of which is incorporated herein by reference.

TECHNICAL FIELD

Embodiments herein relate to handling failures or changes in a virtual network. In particular, embodiments herein relate to a controller and a method therein for handling a failure or change of a processing element in a virtual network. Also, the embodiments herein also relate to a load balancer and method therein for enabling the handling a failure or change of a processing element using a persistent state storage in a virtual network. Furthermore, the embodiments herein also relate to a cloud computing system operating a virtual network.

BACKGROUND

Many 5G communication network applications and processes for example involve managing state for users, sessions, flows, connections, etc. A key part of user/session handover process is also to make seamless transfers of stored user/session state or context from a source processing element to a destination processing element.

At the same time, modern software, in particular software that is designed in accordance with cloud-computing native principles, often makes use of stateless processing functions. In stateless processing functions, the state storage is separated from the processing functions. To support this separation, the processing elements are interfaced with persistent storage systems in which the state is stored according to certain time intervals. This separation of the states from the processing elements simplifies many aspects of large-scale software systems that are deployed in a virtualized cloud environment, which may include enabling e.g. elastic horizontal scaling of the processing elements, fault handling and resiliency, relocation of processes for better infrastructure management, load balancing and alignment of processing resources to actual demand, etc.

In true stateless applications, new service requests may be sent to different processing elements for load balancing across the available processing elements. In this case, the performance is largely dependent on the time it takes for a state to be fetched from a central or distributed persistent storage system, and also on the time it takes the processing element to commit a new state to the persistent storage system. This will normally lead to unsuitably large delays and latencies in e.g. 5G communication network services. In addition, the load on the communications network and on the persistent storage systems may become very high when all state updates are to be committed by the processing elements to the persistent storage system at the same time as current states must be fetched by the processing elements from the persistent storage system.

In order to reduce this load or overhead, the processing elements generally maintain or store a local state that is written to the persistent storage system at regular time intervals. However, this means that certain abrupt failures or changes may result in the loss of state information that has not been committed to, or written into, the persistent storage system. Hence, there is a need to improve state handling in virtual networks, particularly in relation to failures, i.e. errors and faults, or change, i.e. software upgrades, that may occur in the processing elements.

SUMMARY

It is an object of embodiments herein to improve the handling of failures or change of processing elements in a virtual network.

According to a first aspect of embodiments herein, the object is achieved by a method performed by a controller for handling a failure or change of a processing element in a virtual network. The processing element comprises a first stateless executable function that use a local state storage and a persistent state storage when executed on a host in the virtual network. The method comprising maintaining the local state storage of the processing element upon removing the first stateless executable function from the processing element in response to the failure or change. The method also comprises creating a second stateless executable function to replace the first stateless executable function in the processing element. The method further comprises associating the maintained local state storage with the second stateless executable function for the processing element. Then, the method also comprises initiating the second stateless executable function using the associated maintained local state storage such that the processing element resumes execution from its real-time state before the failure or change.

According to a second aspect of embodiments herein, the object is achieved by a controller for handling a failure or change of a processing element in a virtual network. The processing element comprises a first stateless executable function that use a local state storage and a persistent state storage when executed on a host in the virtual network. The controller is configured to maintain the local state storage of the processing element upon removing the first stateless executable function from the processing element in response to the failure or change. The controller is also configured to create a second stateless executable function to replace the first stateless executable function in the processing element. Further, the controller is configured to associate the maintained local state storage with the second stateless executable function for the processing element. Then, the controller is also configured to initiate the second stateless executable function using the associated maintained local state storage such that the processing element resumes execution from its real-time state before the failure or change.

According to a third aspect of embodiments herein, the object is achieved by a method performed by a load balancer for enabling the handling a failure or change of a processing element using a persistent state storage in a virtual network. The method comprising receiving one or more subsequent requests from a user client in the virtual network following an initial request from the user client for an application or service composed of one or more processing elements. The method also comprises directing the one or more subsequent requests from a user client in the virtual network to the same one or more processing elements.

According to a fourth aspect of embodiments herein, the object is achieved by a load balancer for enabling the handling a failure or change of a processing element using a persistent state storage in a virtual network. The load balancer is configured to receive one or more subsequent requests from a user client in the virtual network following an initial request from the user client for an application or service composed of one or more processing elements. Also, the load balancer directs the one or more subsequent request from a user client in the virtual network to the same one or more processing elements.

According to a fifth aspect of the embodiments herein, a cloud computing system in a communications network comprising a controller and/or a load balancer as described above is also provided. Further, according to a sixth aspect of the embodiments herein, a computer program configured to perform the method described above and carriers configured to carry the computer program are also provided.

By maintaining and associating a local state storage with a new stateless executable function upon failure or change of the old stateless executable function, the life-cycle handling of the executable function and the local state storage attached to the processing element are separated. Hence, the local state storage or memory assigned to a processing element is actually locally decoupled from the processing element. Besides both avoiding losses of state information, such as, user/session context, in case of processing element failure or change and avoiding the need for state retrieval from the persistent state storage, this also reduces the time it takes to substitute a processing element; that is, in cases of failure or change of a processing element, this will enable a quick re-boot of the processing element and re-attachment of the maintained local state storage to a new local executable function associated with the re-booted processing element without losing any real-time context or state. Thus, the handling of failures or changes of processing elements in the virtual network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
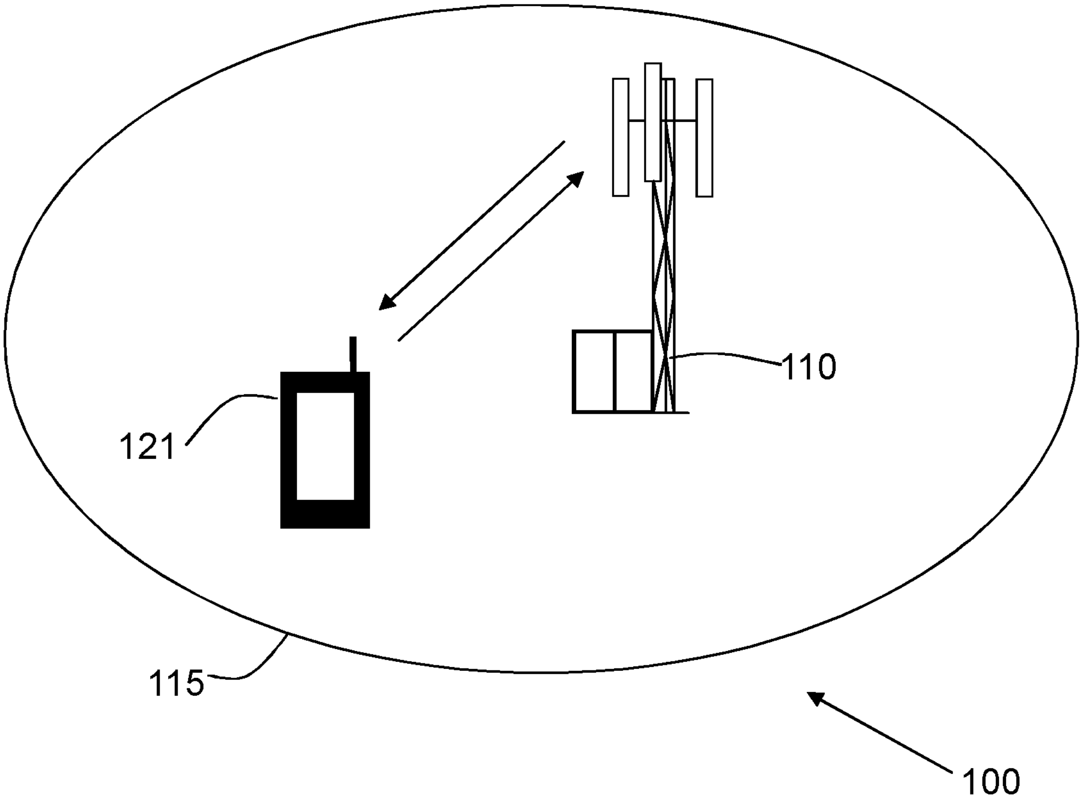
FIG. 1 is a schematic block diagram illustrating a Radio Access Network, RAN, in a wireless communications network.

The figures are schematic and simplified for clarity, and they merely show details which are essential to the understanding of the embodiments presented herein, while other details have been left out. Throughout, the same reference numerals are used for identical or corresponding parts or steps.

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

FIG. 1 depicts a wireless communications network 100 in which embodiments herein may operate. In some embodiments, the wireless communications network 100 may be a radio communications network, such as, New Radio (NR) network. Although, the wireless communications network 100 may also employ technology of any one of 2g/3g, Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a network node 110. The network node 110 serves at least one cell 115. The network node 110 may correspond to any type of network node or radio network node capable of communicating with a wireless device and/or with another network node, such as, e.g. be a base station, a radio base station, gNB, eNB, eNodeB, a Home Node B, a Home eNode B, femto Base Station (BS), pico BS, etc., in the wireless communications network 100. Further examples of the network node 110 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.7 O&M, OSS, SON, positioning node (e.g. E-SMLC), MDT, etc. It should be noted that the network node 110 may be have a single antenna or multiple antennas, i.e. more than one antenna, in order to support Single User MIMO, SU-MIMO, or Multi-User MIMO, MU-MIMO, transmissions. The network node 110 is also adapted to communicate with core network nodes (not shown) in the wireless communications network 100.

In FIG. 1, a wireless device 121 is located within the cell 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc. It should be noted that the wireless device 121 may be have a single antenna or multiple antennas, i.e. more than one antenna, in order to support Single User MIMO, SU-MIMO, or Multi-User MIMO, MU-MIMO, transmissions.

Furthermore, although embodiments below are described with reference to FIG. 1, this should not be construed as limiting to the embodiments herein, but merely as an example made for illustrative purposes. It should also be noted that the wireless communications network 100 in FIG. 1 is here demonstrated as only one example of a communications network that may have low latency requirements, however, any communications network, not only wireless, with low latency requirements may benefit from the embodiments described herein.

As part of the developing of the embodiments described herein, it has been realized that for a containerized application, i.e. a processing element or entity, designed according to a state separation paradigm there are two main parts, a local executable or processing container/function and a local storage volume attached thereto. Here, conventionally, as an executable or processing container/function experiences a failure or change, both the executable or processing container/function and the attached local storage volume are removed to clean up the system. Thereafter, these failures or changes are handled by booting up a new processing element (usually at the same physical node or server, but not always) which then fetches the last committed state from the persistent storage system for all user/sessions which are allocated to the processing element. A problem with this approach is that state information, such as, e.g. user/session context, that was not yet committed to the persistent storage system will be lost and the replacing processing element is required to resume the service from the last committed state in the persistent storage system instead of the real-time state of the processing element at the point in time of the failure or change.

A solution to reduce the impact of such failures or changes is to increase the frequency of state storage in the persistent storage system. However, this will lead to an increased load on the virtual network and on the persistent storage system which may result in failures of the storage hardware. If both the failures or changes are frequent and the frequency of state storage into the persistent storage system is high, the system may create exceedingly high data traffic and load across the entire cloud infrastructure, which in turn may lead to disruptions and affect other services that share the same infrastructure. Similar scenarios have in the past also lead to the so-called "signalling storms" which may cause severe service disruptions if not handled properly.

Another way of dealing with the situation could be to distribute all users/sessions contexts for the failed executable or processing container/function of a processing element to other processing elements. However, this would also lead to a high load on the persistent storage system even if the queries would come from a number of different processing elements distributed in the system. For this case, the load on the remaining processing elements would increase, which may cause an overload situation and subsequent upscaling of the processing elements. This would then be followed by a re-distribution of the load. This means that in cases where the location of the processing element is important, there is also a risk that the users/sessions contexts would be distributed to another processing element which does not fulfil the location requirements.

However, by having a controller maintaining and associating a local state storage with a new stateless executable function upon failure or change of the old stateless executable function state of a processing element in accordance with the embodiments presented herein, the life-cycle handling of the executable function and the local state storage attached to the processing element are separated. Hence, the local state storage or memory assigned to a processing element is actually locally decoupled from the processing element. Besides avoiding both losses of user/session context in case of processing element failure and the need for state retrieval from the persistent state storage, this also reduces the time it takes to substitute a processing element; that is, in cases of failure of a processing element, this will enable a quick re-boot of the processing element and re-attachment of the maintained local state storage to a new local executable function associated with the re-booted processing element without losing any real-time context or state. The latter meaning the real-time information of the users/sessions is maintained during the substitution process of the processing element during failure events.

The embodiments described herein will further enable a failed or changed processing element to be quickly restarted without incurring additional load on the virtual network or nodes in the system. These nodes may, for example, include both other instantiated processing elements for the logical function and/or the persistent storage system. An additional advantage, according to some embodiments herein, is that the frequency of interaction between the processing element and the persistent storage system may be reduced, thereby reducing network data traffic, impact on other services and the load on the persistent storage system.

The embodiments described herein also ensures that no user/session context is lost when a replacement processing element is initialized on the same physical node, as well as, reduces the time to replace a faulty processing element since no user/session context is needed to be fetched from the persistent storage system when the replacement occurs on the same physical node. Here, it may be noted that some of the embodiments may be considered local in the sense that only the actual server where the processing element is running is affected.

Figure 2:
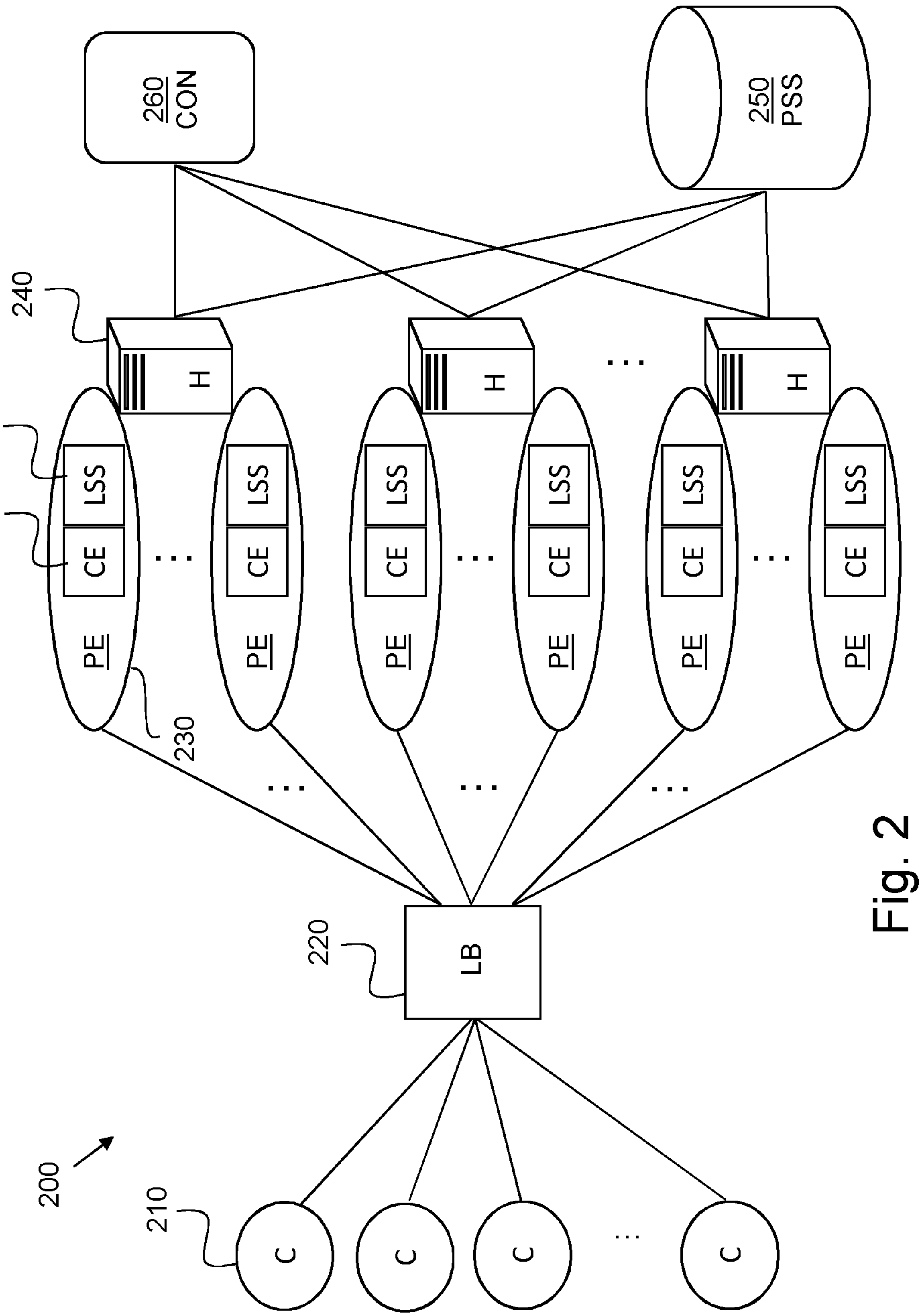
FIG. 2 is a schematic block diagram illustrating an arrangement of a virtual network according to some embodiments.

FIG. 2 shows an illustration of a virtual network 200 according to embodiments herein. The virtual network 200 may be implemented in or as a stateless cloud-computing or cloud native system using various different cloud-computing platforms, such as, e.g. Kubernetes, Docker, etc. The virtual network 200 may be implemented to serve any type of communications network, such as, e.g. the wireless communications network 100.

The virtual network 200 may comprise a number of Clients (C) 210, also referred to as user clients or client applications. For example, a user client 210 may, for example, be executed or operated in a wireless device 121 and/or network node 110 in the wireless communications network 100 shown in FIG. 1. Each of the number of user clients 210 may be configured to direct requests towards an application or service provided in the virtual network 200. Applications or services in the virtual network 200 are composed of, or provided by, one or several Processing Elements (PE) 230. Each of the processing elements 230, or processing entities, in the virtual network 200 may be based on any type of virtualization technology and software, such as, e.g. Linux containers or other virtualization methods. The processing elements 230 may also be referred to as stateful containerized applications or Virtual Network Functions, VNFs.

Each of the processing elements 230 comprise a stateless executable function 231, which may also be referred to as a Container Executable (CE) in some cases. The stateless executable function, or container executables, are stateless functions that, e.g. in response to external triggers, runs and execute specific operations of an application or service. The stateless executable functions 231 are also configured to maintain an operating state, or state, in its associated Local Storage System (LSS) 232. This means that the current state for each user client 210 is being kept at the processing elements 230 in their associated local state storage 232. The local state storages 232 are often realized in a cache or memory allocated to the processing elements 230. Each stateless executable function 231 in each of the processing elements 230 is also conventionally configured to commit the maintained state in its associated local state storage 232 to a global Persistent Storage System (PSS) 250 at predefined regular time intervals. The persistent storage system 250 may be centralized or distributed database systems in which state information may be stored on a long-term basis, i.e. for extended periods of time.

According to one example and as illustrated in FIG. 2, a first group of processing elements 230 are executed in or operated by a first Host (H) 240, also referred to as a host computer. The host 240 may be embodied in the hardware and/or software of a standalone server, a cloud-implemented server, a distributed server or as processing resources in a server farm. Similarly, in the example of FIG. 2, a second group of processing elements 230 are executed in or operated by a second host, while a third group of processing elements 230 are executed in or operated by a third host. The first, second and third host may each correspond to a physical server or any form of digital computational unit capable operating a number of processing elements 230. Here, it should be noted that for the sake of simplicity, the number of hosts shown in FIG. 2 is limited to three, but the virtual network 200 may comprise any suitable number of host or host computers.

In the virtual network 200, a Load Balancer (LB) 220 may be configured to distribute incoming requests from the user clients 210 towards available processing elements 230. The user clients 210 may connect with the load balancer 220 over an intermediate network, such as, for example, one of, or a combination of more than one of, a public, private or hosted network (e.g. a backbone network or the Internet). Optionally, in some cases, wherein the virtual network 200 is configured to serve a wireless communications network, the virtual network 200 may be directly connected to the core network of the wireless communications network. The load balancer 220 is described in more detail below with reference to FIGS. 6-7. In some embodiments, the load balancer 220 may be configured to direct subsequent requests from a user client 210 towards the same processing elements 230 as it previously has directed an initial or previous requests from the same user client 210. Also, in some embodiments, the load balancer 220 may be configured to select new available processing elements 230 for processing initial or subsequent requests, so as to balance the system or processing load of the hosts upon scale-up of the virtual network 200. In some embodiments, the load balancer 220 may further also be configured to evacuate one or several processing elements 230 one-by-one when attempting to decrease the system or processing load of the hosts. Decreasing the system or processing load of the hosts in this way may be advantageous in order to limit any burst effects that may occur when, for example, the load balancer 220 determines that many user clients 210 need a new available processing elements 230 at the same time.

According to some embodiments, the virtual network 200 comprises a controller (CON) 260 that may control how the processing elements 230 are deployed and operated in the virtual network 200. The controller 260 may be configured to communicate with each of the hosts 240 in the virtual network 200. In some embodiments, the controller 260 may also be implemented in the host 240. The controller 260 and a method performed by the controller 260 is described in more detail below with reference to FIGS. 3-5.

Figure 3:
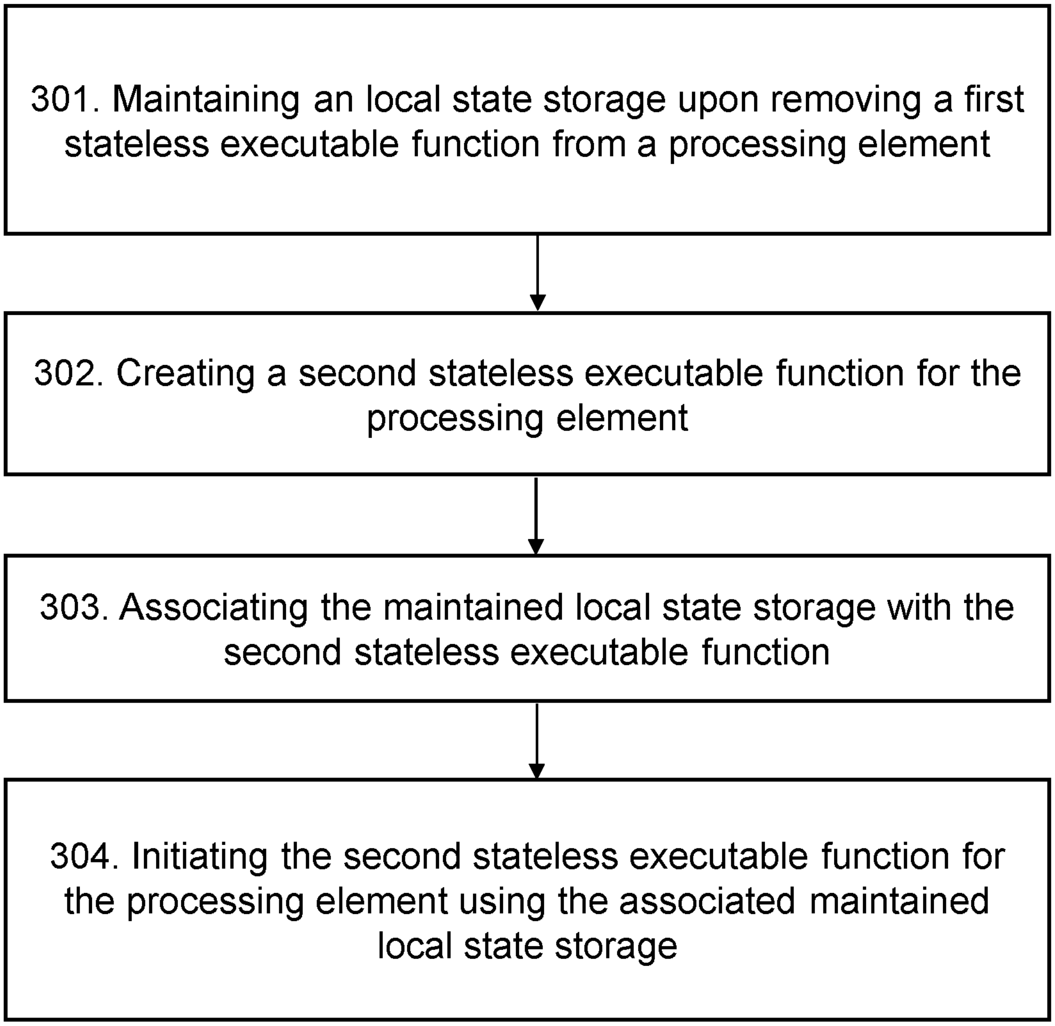
FIG. 3 is a flowchart depicting embodiments of a method performed by a controller in a virtual network.

Examples of embodiments of a method performed by a controller 260 for handling a failure or change of a processing element 230 in a virtual network 200, will now be described with reference to the flowchart depicted in FIG. 3. The processing element 230 comprises a first stateless executable function 231 that use a local state storage 232 and a persistent state storage 250 when executed on a host 240 in the virtual network 200. According to some embodiments, the virtual network 200 is capable of serving any type of communication network or wireless telecommunications network 100. In some embodiments, the virtual network 200 may be implemented using a cloud-computing platform. FIG. 3 is an illustrated example of actions or operations which may be taken by the controller 260 in the virtual network 200. The method may comprise the following actions.

Action 301

After removing the first stateless executable function 231 from the processing element 231 in response to the failure or change, the controller 260 maintains the local state storage 232 of the processing element 230. This means, for example, that in cases where the first stateless executable function 231 is removed, e.g. due to a crash or failure, or need to be restored from the beginning for any other reasons, such as, e.g. due to a system upgrade, the local state storage 232 associated the first stateless executable function 231 is kept. For example, the controller 260 may ensure that the memory or cache in the host 240 associated with the local state storage 232 is not flushed, i.e. erased or wiped clean.

It should be noted that the local state storage 232 may be enabled by using different technologies providing local persistence, such as, e.g. a Random Access Memory, RAM, or non-volatile RAM, NVRAM. However, any type of storage technology may be used, such as, mechanical hard drives or in-memory disks for lowest possible latency. These storages may be configured to commit the state locally from the RAM, memory or cache that was used as local state storage 232 by the failed processing element 230. According to some examples, using NVRAM instead of conventional RAM may reduce time-consumption and limit the sometimes lengthy process of booting up software systems. This is typically useful in cases of, for example, power failure or power saving features.

In some embodiments, the controller 260 may maintain the local state storage 232 by further retaining an identifier of the local state storage 232. This ensures that the state stored in the local state storage 232 will be able to be identified and associated with the operations executed by the first stateless executable function 231. In this case, according to some embodiments, the identifier of the local state storage 232 is a process identification numeral or process ID that is identical with the process identification numeral or process ID associated with the first stateless executable function 231. This ensures that the state stored in the local state storage 232 will maintain its direct association to the operations executed by the first stateless executable function 231.

Action 302

As the local state storage 232 of the processing element 230 is maintained by the controller 260 in Action 301, the controller 260 creates a second stateless executable function 231' to replace the first stateless executable function 231 of the processing element 230. This means, for example, that a second stateless executable function 231' may be created, booted up or instantiated to form a new version or copy of the processing element 230 to replace the faulty processing element 230.

Action 303

The controller 260 then associates the maintained local state storage 232 in the processing element 230 with the created second stateless executable function 231' for the processing element 230. This means that the maintained local state storage 232 is attached to the processing element 230 comprising the newly created second stateless executable function 231'; this, instead of the processing element 230 being populated with state information retrieved from the persistent state storage 250, i.e. the last committed state by first stateless executable function 231. In some embodiments, this may be performed using the retained identifier of the local state storage 232.

Action 304

After the association in Action 303, the controller 260 initiates the second stateless executable function 231' using the associated maintained local state storage 232 such that the processing element 230 resumes execution from its real-time state before the failure or change. This means that instead of having to resume the service from the last committed state by first stateless executable function 231 in the persistent storage system 250, the service may instead be resume from the real-time state of the processing element 230 at the point in time of the failure.

In some embodiments, the real-time state of the processing element 230 comprises the last user/session context information associated with an application or service requested by a user client 210 in the virtual network 200. This means that all user/session context information present at the point in time of the failure may be used when restarting the application or service in the processing element 230. In some embodiments, the second stateless executable function 231' is initiated on the same host 240 in the virtual network 200 that executes the processing element 230 with the first stateless executable function 231 and the local state storage 232. This ensures that the the second stateless executable function 231' may be associated with the maintained local state storage 232.

According to some embodiments, the controller 260 may configure the first and second stateless executable functions 231, 231' to maintain the state of the processing element 230 in the local state storage 232, and commit the state of the processing element 230 to the persistent state storage 250 at determined time intervals. This means that, both before and after the failure, the stateless executable function of the processing element 230 will maintain the process of committing its state to the persistent state storage 250 in the virtual network 200. In some embodiments, the processing element 230 may be a virtual container, the first and second stateless executable functions 231, 231' may be container executables, and the local state storage 232 may be a storage class allocation. Here, it should be noted that for existing cloud platforms, such as, for example, Kubernetes, the controller 260 may be realized by the Kubernetes control plane, such as, e.g. by adding a new Kubernetes operator or controller. This controller 260 then needs to be designed to ensure that the local state storage 232 is not flushed, erased or wiped when a container/pod, e.g. the first stateless executable functions 231, is deleted. This may further require some feature updates to the operating system default behaviour in conjunction with the added controller, such as, for example, updating the Linux kernel and its default memory management functions for killed processes.

Figure 4:
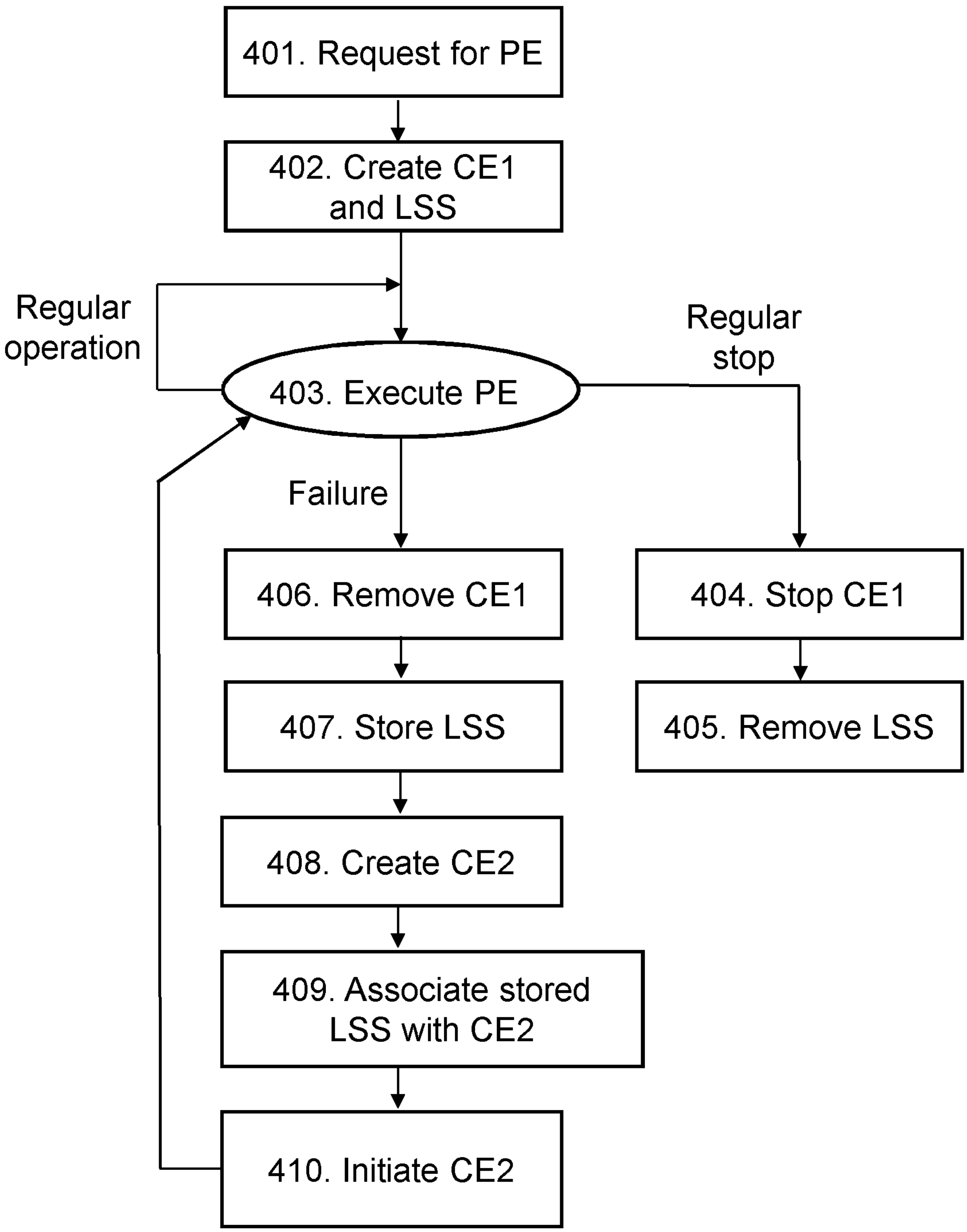
FIG. 4 is another flowchart depicting embodiments of a method performed by a controller in a virtual network.

FIG. 4 shows another and more detailed flowchart depicting, for example, embodiments of a method performed by a controller 260 in a virtual network 200.

In Action 401, the controller 260 may receive a request for an application or service composed of, or provided by, one or more processing elements PEs of the host 240 in the virtual network 200.

In Action 402, in response to the request in Action 401, the controller 260 may instantiate or create a PE at the host 240 in the form of a first container executable CE1 and an local state storage LSS that is associated with the CE1. This may occur in case, for example, no previous PE exists or the processing load on the existing PEs in the virtual network 200 cannot accommodate a new request.

In Action 403, the controller 260 starts to execute the PE in the host 240. In other words, after the creation of the CE1 and the LSS, the PE is ready and may enter an execution stage. The PE may remain in the execution stage until it is either stopped, see Actions 404-405, or it experiences a failure or change situation, see Actions 406-410.

In Actions 404, the controller 260 stops the CE1. In Action 405, the controller 260 removes the LSS. This may be performed, for example, by flushing or erasing the memory or cache in the host 240 associated with the CE1.

In Action 406, the controller 260 removes the CE1 of the PE. In Action 407, the controller 260 maintains or stores the state information present in the LSS. Here, the controller 260 may, for example, maintain the LSS (e.g. by storing or refraining from erasing the LSS) and store an identifier of the LSS. This may, for example, be performed for the purpose of enabling an attachment to a replacing container executable. In Action 408, the controller 260 creates a second container executable CE2 to replace the CE1 in the PE. Then, in Action 409, the controller 260 associates the CE2 with the maintained LSS. For example, the controller 260 may attach the maintained LSS to the CE2 using the stored identifier of the LSS.

Finally, in Action 410, the controller 260 may initiate the CE2 using the associated LSS, and the state information present therein, in order to bring the PE up and running again. Hence, the PE again enters the execution state according to Action 403. Thus, the PE is able to resume its processing of the application or service from the real-time state of the PE at the point in time of the failure or fault.

Figure 5:
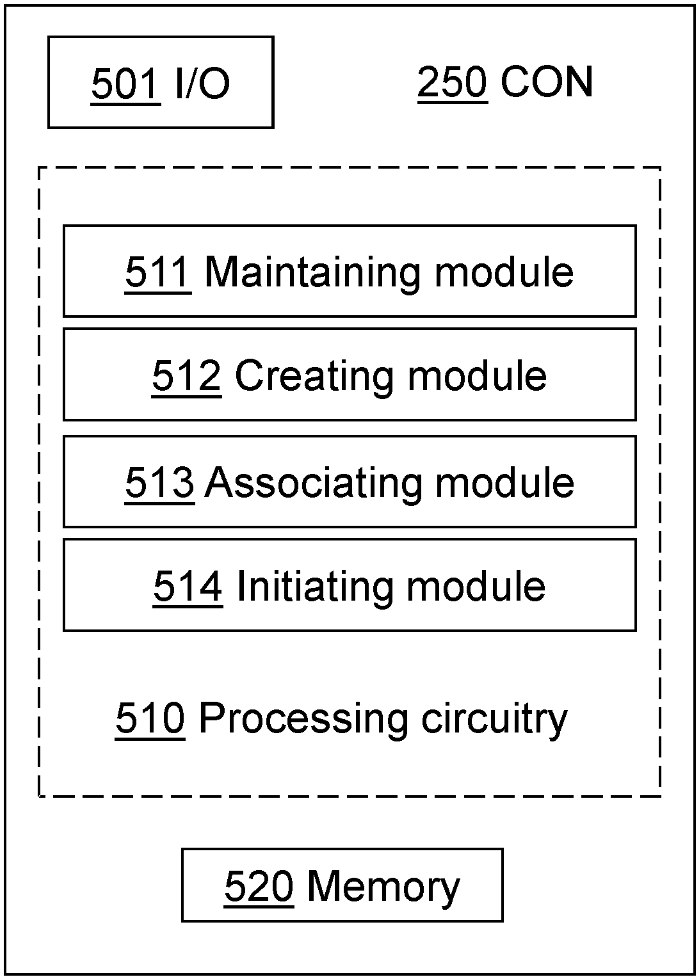
FIG. 5 is a block diagram depicting embodiments of a controller.

To perform the method actions in a controller 260 for handling a failure or change of a processing element 230 in a virtual network 200 described above with reference to FIGS. 3-4, the controller 260 may comprise the following arrangement depicted in FIG. 5. The processing element 230 comprises a first stateless executable function 231 that use a local state storage 232 and a persistent state storage 250 when executed on a host 240 in the virtual network 200. FIG. 5 shows a schematic block diagram of embodiments of the controller 260. The embodiments of the controller 260 described herein may be considered as independent embodiments or may be considered in any combination with each other to describe non-limiting examples of the embodiments described herein.

The controller 260 may comprise processing circuitry 510, and a memory 520. The controller 260, or the processing circuitry 510, may also comprise an Input/Output (I/O) module 501 comprising circuitry capable of receiving and transmitting signals and information from other network nodes in the virtual network 200. It should also be noted that some or all of the functionality described in the embodiments above as being performed by the controller 260 may be provided by the processing circuitry 510 executing instructions stored on a computer-readable medium, such as, e.g. the memory 520 shown in FIG. 5. Alternative embodiments of the controller 260 may comprise additional components, such as, for example, a maintaining module 511, a creating module 512, an associating module 513 and an initiating module 514, each responsible for providing its respective functionality necessary to support the embodiments described herein.

The controller 260 or processing circuitry 510 is configured to, or may comprise the maintaining module 511 configured to, maintain the local state storage 232 of the processing element 230 after removing the first stateless executable function 231 from the processing element 230 in response to the failure or change. Also, the controller 260 or processing circuitry 510 is configured to, or may comprise the creating module 512 configured to, create a second stateless executable function 231' to replace the first stateless executable function 231 in the processing element 230. The controller 260 or processing circuitry 510 is further configured to, or may comprise the associating module 513 configured to, associate the maintained local state storage 232 with the second stateless executable function 231' for the processing element 230. Furthermore, the controller 260 or processing circuitry 510 is configured to, or may comprise the initiating module 514 configured to, initiate the second stateless executable function 231' using the associated maintained local state storage 232 such that the processing element 230 resumes execution from its real-time state before the failure or change. Here, according to some embodiments, the real-time state of the processing element 230 may comprise user/session context information associated with an application or service requested by a user client 210 in the virtual network 200.

Also, the controller 260 or processing circuitry 810 may further be configured to, or may comprise the initiating module 514 configured to, initiate the second stateless executable function 231' on the same host 240 in the virtual network 200 as executes the processing element 230, the first stateless executable function 231, and the local state storage 232. Further, in some embodiments, the controller 260 or processing circuitry 510 may further be configured to, or may comprise the maintaining module 514 configured to, maintain the local state storage 232 by retaining an identifier of the local state storage 232. In this case, the identifier of the local state storage 232 may be a process identification numeral or process ID that is identical with the process identification numeral or process ID associated with the first stateless executable function 231. In some embodiments, the first and second stateless executable functions 231, 231' may be configured to maintain the state of the processing element 230 in the local state storage 232 and commit the state of the processing element 230 to the persistent state storage 250 at determined time intervals.

Further, according to some embodiments, the processing element 230 may be a virtual container. In this case, the first and second stateless executable functions 231, 231' may be container executables, and the local state storage 232 may be a storage class allocation. In some embodiments, the virtual network 200 may serve any type of communication network or wireless telecommunications network. Also, in some embodiments, the virtual network 200 is implemented using a cloud-computing platform.

Furthermore, the embodiments for handling a failure or change of a processing element 230 in a virtual network 200 described above may be implemented through one or more processors, such as the processing circuitry 510 in the controller 260 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the controller 260. The data carrier, or computer readable medium, may be one of an electronic signal, optical signal, radio signal, or computer-readable storage medium. The computer program code may e.g. be provided as pure program code in the controller 260 or on a server and downloaded to the controller 260. Thus, it should be noted that the modules of the controller 260 may in some embodiments be implemented as computer programs stored in memory, e.g. in the memory modules 520 in FIG. 5, for execution by processors or processing modules, e.g. the processing circuitry 510 of FIG. 5.

Those skilled in the art will also appreciate that the processing circuitry 510 and the memory 520 described above may refer to a combination of analog and digital circuits, and/or one or more processors configured with software and/or firmware, e.g. stored in a memory, that when executed by the one or more processors such as the processing circuitry 520 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
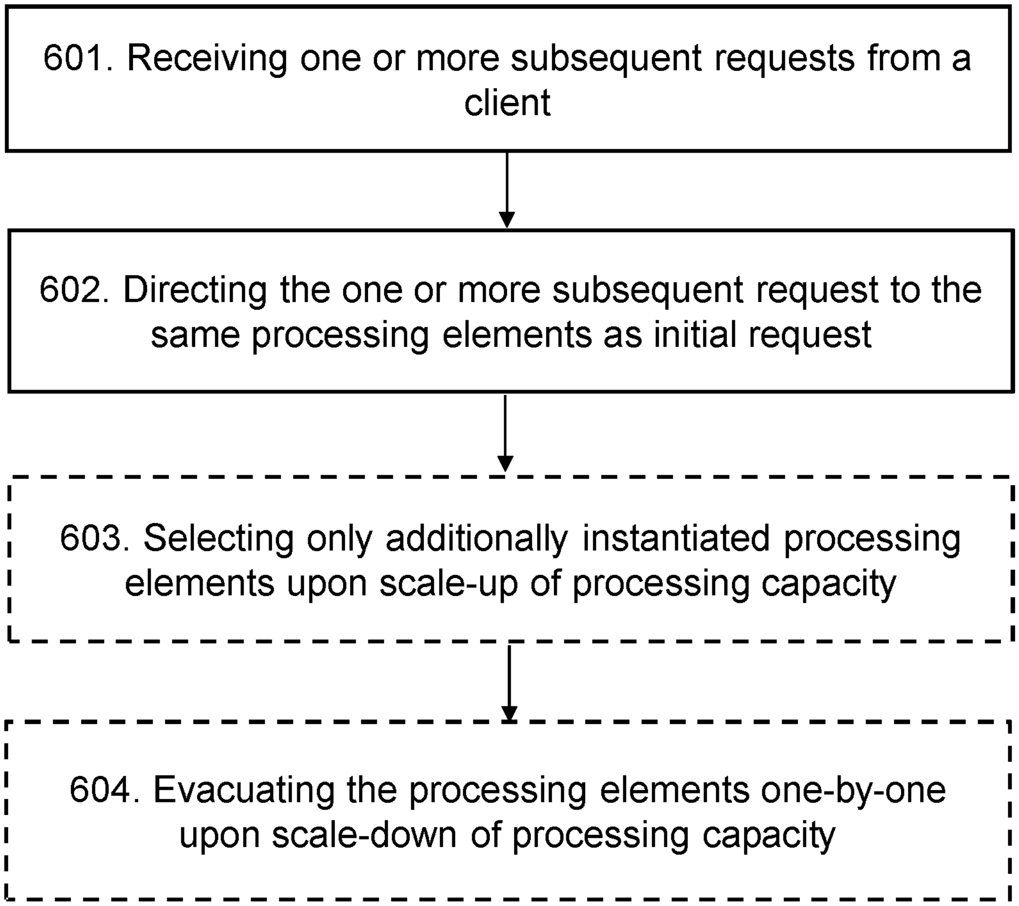
FIG. 6 is a flowchart depicting embodiments of a method performed by a load balancer in a virtual network.

Examples of embodiments of a method performed by a load balancer 220 for enabling the handling a failure or change of a processing element 230 using a persistent state storage 250 in a virtual network 200, will now be described with reference to the flowchart depicted in FIG. 6. FIG. 6 is an illustrated example of actions or operations which may be taken by the load balancer 220 in the virtual network 200. The method may comprise the following actions.

Action 601

First, the load balancer 220 may receive one or more subsequent requests from a user client 210 in the virtual network 200 following an initial request from the same user client 210 for an application or service composed of one or more processing elements 230. This means that the load balancer 220 previously already has directed an initial request from the same user client 210 to a specific application or service composed of one or several processing elements 230.

Action 602

After receiving the one or more subsequent requests in Action 601, the load balancer 220 may direct the one or more subsequent requests from the same user client 210 in the virtual network 200 solely towards the same one or more processing elements 230. This means that no new processing elements will be started or initiated for the one or more subsequent requests until the faulty or failed processing element 230 has been re-initiated with the second stateless executable function 231' by the controller 260 in the virtual network 200.

Action 603

Optionally, in some embodiments, the load balancer 220 may also select only additionally instantiated processing elements 230 in order to balance the load when performing a scale-up of processing capacity in the virtual network 200. This may be performed in order to avoid distributing specific application or services composed of one or several processing elements 230 to other processing elements 230 in the virtual network 200 which may disrupt the re-initiation of the faulty or failed processing element 230 with the second stateless executable function 231'.

Action 604

According to another option, in some embodiments, the load balancer 220 may also evacuate processing elements 230 one-by-one in order to balance the load when performing a scale-down of processing capacity in the virtual network 200. This may be performed by the load balancer 220 to limit the burst effect of having a large number of user clients 210 being required to select a new processing element at the same time.

Figure 7:
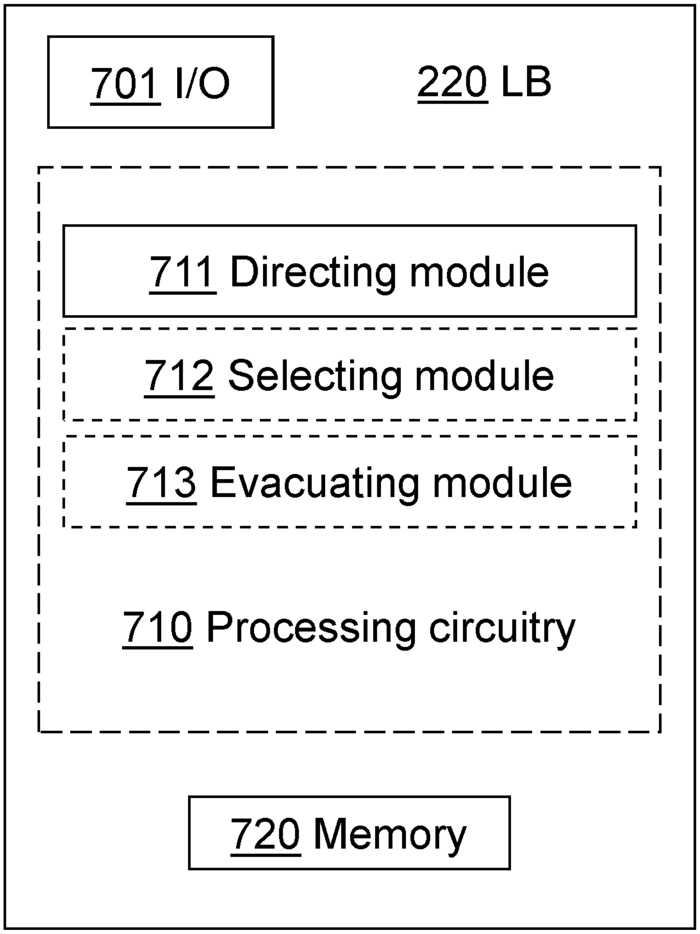
FIG. 7 is a block diagram depicting embodiments of a load balancer.

To perform the method actions for enabling the handling a failure or change of a processing element 230 using a persistent state storage 250 in a virtual network 200, the load balancer 220 may comprise the following arrangement depicted in FIG. 7. FIG. 7 shows a schematic block diagram of embodiments of the load balancer 220. The embodiments of the load balancer 220 described herein may be considered as independent embodiments or may be considered in any combination with each other to describe non-limiting examples of the embodiments described herein.

The load balancer 220 may comprise processing circuitry 710, and a memory 720. The load balancer 220 may comprise processing circuitry 710, and a memory 720. The load balancer 220, or the processing circuitry 710, may also comprise an Input/Output (I/O) module 701 comprising circuitry capable of receiving and transmitting signals and information from other network nodes in the virtual network 200. It should also be noted that some or all of the functionality described in the embodiments above as being performed by the load balancer 220 may be provided by the processing circuitry 710 executing instructions stored on a computer-readable medium, such as, e.g. the memory 720 shown in FIG. 7. Alternative embodiments of the load balancer 220 may comprise additional components, such as, for example, a directing module 711, a selecting module 712, and an evacuating module 713, each responsible for providing its respective functionality necessary to support the embodiments described herein.

The load balancer 220 or processing circuitry 710 is configured to, or may comprise the I/O module 701 configured to, receive one or more subsequent requests from a user client 210 in the virtual network 200 following an initial request from the same user client 210 for an application or service composed of one or more processing elements 230. Also, the load balancer 220 or processing circuitry 710 is configured to, or may comprise the directing module 711 configured to, direct the one or more subsequent requests from the same user client 210 in the virtual network 200 solely towards the same one or more processing elements 230.

In some embodiments, the load balancer 220 or processing circuitry 710 may further be configured to, or may comprise the selecting module 712 configured to, select only additionally instantiated processing elements 230 in order to balance the load when performing a scale-up of processing capacity in the virtual network 200. Here, the load balancer 220 or processing circuitry 710 may further be configured to, or may comprise the evacuating module 713 configured to, evacuate processing elements 230 one-by-one in order to balance the load when performing a scale-down of processing capacity in the virtual network 200.

Furthermore, the embodiments for enabling the handling a failure of a processing element 230 using a persistent state storage 250 in a virtual network 200 described above may be implemented through one or more processors, such as the processing circuitry 710 in the load balancer 220 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the load balancer 220. The data carrier, or computer readable medium, may be one of an electronic signal, optical signal, radio signal, or computer-readable storage medium. The computer program code may e.g. be provided as pure program code in the load balancer 220 or on a server and downloaded to the load balancer 220. Thus, it should be noted that the modules of the load balancer 220 may in some embodiments be implemented as computer programs stored in memory, e.g. in the memory modules 720 in FIG. 7, for execution by processors or processing modules, e.g. the processing circuitry 710 of FIG. 7.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 720 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

CE Container Executable
CON Controller
LSS Local State Storage
LB Load Balancer
NV-RAM Non-Volatile RAM
RAM Random Access Memory
PE Processing Element
PSS Persistent State Storage
VNF Virtual Network Function

The invention claimed is:

1. A method performed by a controller for handling a failure or change of a processing element in a virtual network, the processing element having a first stateless executable function that uses a local state storage and a persistent state storage when executed on a host in the virtual network, the method comprising:

maintaining the local state storage of the processing element after removing the first stateless executable function from the processing element in response to the failure or change, the maintaining of the local state storage comprising retaining an identifier of the local state storage, the identifier of the local state storage being a process identification numeral or process ID that is identical with the process identification numeral or process ID associated with the first stateless executable function;

creating a second stateless executable function to replace the first stateless executable function of the processing element, the first and second stateless executable functions being interfaced with persistent storage systems in which a state is stored according to certain time intervals;

associating the maintained local state storage of the processing element with the created second stateless executable function of the processing element, using the retained identifier of the local state storage; and initiating the second stateless executable function using the associated maintained local state storage such that the processing element resumes execution from its real-time state before the failure or change.

2. The method according to claim 1, wherein the real-time state of the processing element comprises the last user/session context information associated with an application or service requested by a user client in the virtual network.

3. The method according to claim 1, wherein the second stateless executable function is initiated on the same host in the virtual network that executes the processing element with the first stateless executable function and the local state storage.

4. The method according to claim 1, wherein the first and second stateless executable functions are configured to maintain the state of the processing element in the local state storage and commit the state of the processing element to the persistent state storage at determined time intervals.

5. The method according to claim 1, wherein the processing element is a virtual container, the first and second stateless executable functions are container executables, and the local state storage is a storage class allocation.

6. The method according to claim 1, wherein the virtual network is implemented using a cloud-computing platform.

7. A controller for handling a failure or change of a processing element in a virtual network, the controller comprising processing circuitry and a memory, the processing element having a first stateless executable function that uses a local state storage and a persistent state storage when executed on a host in the virtual network, the controller being configured to:

maintain the local state storage of the processing element after removing the first stateless executable function from the processing element in response to the failure or change, the maintaining of the local state storage comprising retaining an identifier of the local state storage, the identifier of the local state storage being a process identification numeral or process ID that is identical with the process identification numeral or process ID associated with the first stateless executable function;

create a second stateless executable function to replace the first stateless executable function in the processing element, the first and second stateless executable functions being interfaced with persistent storage systems in which a state is stored according to certain time intervals;

associate the maintained local state storage with the second stateless executable function for the processing element, using the retained identifier of the local state storage; and initiate the second stateless executable function using the associated maintained local state storage such that the processing element resumes execution from its real-time state before the failure or change.

8. The controller according to claim 7, wherein the real-time state of the processing element comprises the last user/session context information associated with an application or service requested by a user client in the virtual network.

9. The controller according to claim 7, further configured to initiate the second stateless executable function on the same host in the virtual network that executes the processing element, the first stateless executable function, and the local state storage.

10. The controller according to claim 7, wherein the first and second stateless executable functions are configured to maintain the state of the processing element in the local state storage and commit the state of the processing element to the persistent state storage at determined time intervals.

11. The controller according to claim 7, wherein the processing element is a virtual container, the first and second stateless executable functions are container executables, and the local state storage is a storage class allocation.

12. The controller according to claim 7, wherein the virtual network is implemented using a cloud-computing platform.

* * * * *